US012750150B2

(12) United States Patent
Qi et al.

(10) Patent No.: US 12,750,150 B2
(45) Date of Patent: Sep. 29, 2026

(54) CIRCULAR TIME SHIFT MODULATION FOR COMMUNICATIONS

(71) Applicant: Rutgers, The State University of New Jersey, New Brunswick, NJ (US)

(72) Inventors: Zhuoran Qi, New Brunswick, NJ (US); Dario Pompili, Hillsborough, NJ (US)

(73) Assignee: Rutgers, The State University of New Jersey, New Brunswick, NJ (US)

(*) Notice: Subject to any disclaimer, the term of this patent is extended or adjusted under 35 U.S.C. 154(b) by 352 days.

(21) Appl. No.: 18/619,564

(22) Filed: Mar. 28, 2024

(65) Prior Publication Data

US 2024/0333413 A1 Oct. 3, 2024

Related U.S. Application Data

(60) Provisional application No. 63/455,740, filed on Mar. 30, 2023.

(51) Int. Cl.

| | |
|---|---|
| ***H04W 4/00*** | (2018.01) |
| ***H04J 13/00*** | (2011.01) |
| ***H04J 13/14*** | (2011.01) |
| ***H04J 13/22*** | (2011.01) |

(52) U.S. Cl.
CPC .......... *H04J 13/0055* (2013.01); *H04J 13/14* (2013.01); *H04J 13/22* (2013.01)

(58) Field of Classification Search
CPC ........ H04J 13/0055; H04J 13/14; H04J 13/22; H04J 11/00; H04J 13/0074; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | | |
|---|---|---|---|---|
| 2011/0096810 A1* | 4/2011 | Suehiro | H04B 1/7103 375/E1.001 |
| 2014/0003474 A1* | 1/2014 | Xin | H04J 13/107 375/295 |
| 2025/0038878 A1* | 1/2025 | Pompili | H04J 14/05 |
| 2025/0047534 A1* | 2/2025 | Yuan | H04L 25/0224 |

OTHER PUBLICATIONS

Qi et al, "UW-CTSM: Circular Time Shift Modulation for Underwater Acoustic Communications." 17th Wireless On-Demand Network Systems and Services Conference (WONS), Oppdal, Norway, pp. 1-8, (2022).

* cited by examiner

*Primary Examiner* — Phuongchau Ba Nguyen
(74) *Attorney, Agent, or Firm* — Meagher Emanuel Laks Goldberg & Liao, LLP

(57) ABSTRACT

Various embodiments comprise systems, methods, architectures, mechanisms and apparatus for undersea transmission using a Zero-Correlation-Zone (ZCZ) signal with an auto-correlation function having a zero-sidelobe zone, wherein modulated data is mapped to circular time shifts in ZCZ signals for transmission, and wherein periodic cross-correlation function peaks of received ZCZ signals are detected to enable thereby recovery of the circular time shifts in the received ZCZ signals in the time domain.

20 Claims, 12 Drawing Sheets

PPM signals.

SS-PPM signals.

CTSM signals.

400

CIRCULAR TIME SHIFT MODULATION FOR COMMUNICATIONS

CROSS-REFERENCE TO RELATED APPLICATION

This application claims priority to U.S. Provisional Patent Application No. 63/455,740, filed on Mar. 30, 2023, entitled CIRCULAR TIME SHIFT MODULATION FOR UNDERWATER ACOUSTIC COMMUNICATIONS, which application is incorporated herein by reference in its entirety.

GOVERNMENT INTEREST

This invention was made with government support under NSF NeTS Award No. CNS-1763964. The government has certain rights in the invention.

FIELD OF THE DISCLOSURE

The present disclosure generally relates to underwater communications and, in particular, to Circular Time Shift Modulation (CTSM) facilitating such communications.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Underwater wireless communication has played an important role in the military, commercial, and scientific fields. With the increasing demand for reliable underwater wireless communication systems, three main-stream communications mechanisms are typically considered: Underwater Radio Frequency Communication (URFC), Underwater Acoustic Communication (UAC), and Underwater Wireless Optical Communication (UWOC). The URFC provides high bandwidth and data rate, but radio waves suffer high attenuation in seawater due to the high conductivity and permittivity, leading to a limited coverage distance of up to a few meters. The UWOC offers a wider bandwidth in the scale of hundreds of megahertz. However, the UWOC suffers from water absorption and scattering effects and attenuates greatly. Additionally, some alignments between the transmitter and the receiver are required, and the quality of the communication link can be severely impaired by external factors, such as the presence of sources of reflection, e.g., bubbles. Different from the URFC and the UWOC, the UAC suffers less attenuation and covers a communication range of up to kilometers, but the underwater acoustic speed is as slow as 1500 m/s, leading to time-varying multipath delay. Moreover, the Doppler effects caused by the dynamic water wave, low bandwidth, sound speed variability, and frequency-dependent scattering losses still make UAC a challenge.

Improvements are desired.

SUMMARY

Various deficiencies in the prior art are addressed by systems, methods, architectures, mechanisms and apparatus of undersea transmission using a Zero-Correlation-Zone (ZCZ) signal with an auto-correlation function having a zero-sidelobe zone, wherein modulated data is mapped to circular time shifts in ZCZ signals for transmission, and wherein periodic cross-correlation function peaks of received ZCZ signals are detected to enable thereby recovery of the circular time shifts in the received ZCZ signals in the time domain.

A method of undersea communication according to an embodiment comprises: converting input data into decimal values in accordance with Zero-Correlation-Zone (ZCZ) mapping; modulating the ZCZ mapped decimal values in accordance with Circular Time Shift Modulation (CTSM); and transmitting the CTSM modulated signal via a submerged acoustic output device, or via a free space RF or optical communications system.

An apparatus according to an embodiment comprises: a Circular Time Shift Modulation (CTSM) transmitter configured for generating a CTSM signal for undersea transmission, the CTSM transmitter comprising: a binary-to-decimal converter, for converting input data into decimal values in accordance with Zero-Correlation-Zone (ZCZ) mapping; and a circular time shift mapper, for modulating the ZCZ mapped decimal values in accordance with a CTSM scheme.

Additional objects, advantages, and novel features of the invention will be set forth in part in the description which follows and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
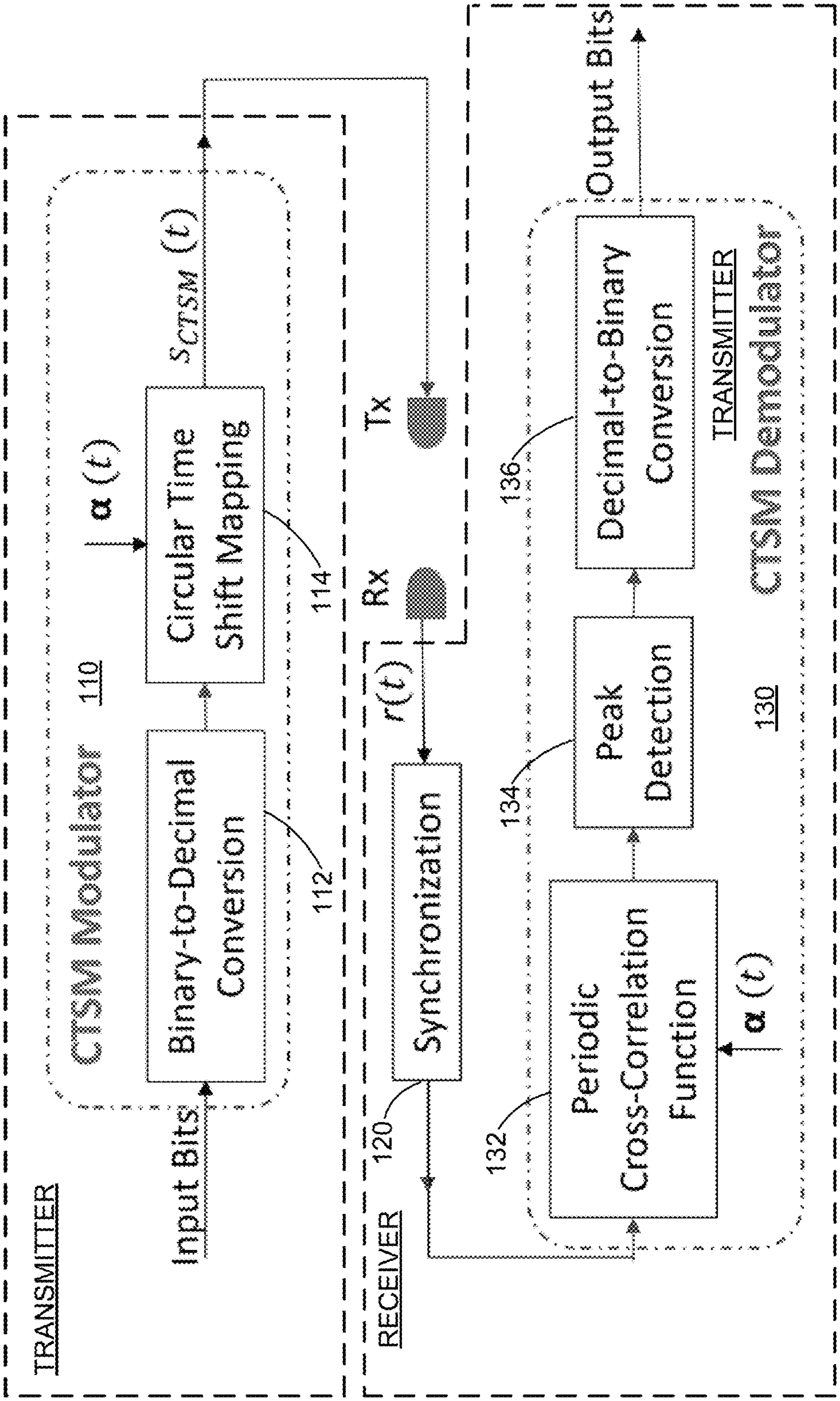
FIG. 1 depicts a simplified block diagram of an underwater communications system according to various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments may be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various approaches to robust underwater communication techniques have been investigated by the inventors. Pulse Position Modulation (PPM) has shown great advantages by being non-coherently implementable. However, PPM suffers from the high multipath delay in underwater acoustic channels. To be robust against the doubly spread effects in underwater acoustic communications, the various embodiments provide a novel modulation scheme that is non-linear and that can be implemented non-coherently, denoted as Circular Time Shift Modulation (CTSM) based on the high auto-correlation property of Zero-Correlation-Zone (ZCZ) signals. Upon investigating performance of CTSM in terms of bit error rate, the inventors have shown that the CTSM system has higher robustness compared with PPM in underwater acoustic communications.

In UACs, Coherent Phase-Shift Keying (CPSK) modulation has been widely used, which conveys data by changing the phase of the carrier waves. However, the CPSK requires a complicated demodulator to compare the phase of received signals to a reference signal. As for the linear signal with coherent detection, where the noise and Doppler effects work on the transmitted symbols directly by introducing the phase offset, the accuracy of CPSK demodulation can be influenced dramatically. To reduce the complication of demodulation, Differential Phase-Shift Keying (DPSK) works as an alternative modulation scheme which demodulates non-coherently by measuring the phase shift of each symbol with respect to the previous symbol. Nonetheless, more demodulation errors are introduced compared with CPSK because errors in the previous symbol lead to errors in the following symbols.

In contrast, the Pulse Position Modulation (PPM) is power-efficient and does not need to track the carrier phase information. Instead, the only concern is the power peak position of each received PPM frame, so that the phase offset caused by noise hardly has an impact on the PPM signal transmission and the high cost of phase detection can be discarded. In PPM modulation, data are transmitted by different pulse positions which are in proportion to the amplitude of the message signal in the time domain, while the pulse width and amplitude are the same. In this case, all of the interest information is concentrated on the peak position per PPM frame. However, PPM is sensitive to the multipath delay that arises in the underwater acoustic channel. Rician fading channel has been shown to be a good match for the short-range shallow water channel (with a depth of less than 100 m), where the power of the Line-of-Sight (LOS) signal is stronger than the multipath delay signals. With a high Signal-to-Noise Ratio (SNR), the PPM works effectively, but with a low SNR, the power of multipath delay signals plus additive noise might be higher than that of the LOS signal, leading to demodulation errors. To improve the robustness of the UAC system at the physical layer, a non-coherent modulation scheme that can effectively defend against doubly spread (multipath spread and Doppler spread) effects and additive noise is in great need.

Various embodiments provide systems, methods, architectures, mechanisms, and apparatus for improving robustness of Underwater Acoustic Communications (UAC) the physical layer (PHY) while mitigating multipath and additive noise.

Various embodiments contemplate the use of a Zero-Correlation-Zone (ZCZ) signal with an auto-correlation function having a zero-sidelobe zone, wherein modulated data is mapped to circular time shifts in ZCZ signals for transmission, and wherein periodic cross-correlation function peaks of received ZCZ signals are detected to enable thereby recovery of the circular time shifts in the received ZCZ signals in the time domain.

The various embodiments address the issues of doubly spread effects plus additive noise by using Zero-Correlation-Zone (ZCZ) signals whose auto-correlation function has zero-sidelobe zone. At the transmitter side, the data are mapped to the corresponding circular time shifts in ZCZ signals. At the receiver side, the periodic cross-correlation function between the received ZCZ signals and the initial ZCZ signal are determined. The position of the peak of the periodic cross-correlation function is exactly the time shift, and the data may then be demodulated successfully. Unlike PPM, the various embodiments provide peak detection with the periodic cross-correlation between the received ZCZ signals and the initial signal, while in the PPM, the peak detection is done with the received PPM signals.

The various embodiments provide a new modulation scheme for UACs that can achieve a significant gain of several dB compared with the PPM. The contributions are as follows. The below-described Circular Time Shift Modulation (CTSM) methodologies include modulator and demodulator embodiments and supporting equations which, when applied as contemplated by the inventors, significantly enhance underwater acoustic system robustness at the physical layer.

The CTSM signal is conveyed by the non-linear modulation of circular time shifts in ZCZ signals, and the receiver does peak detection of period cross-correlation function between the received ZCZ signals and the initial ZCZ signal to recover the circular time shifts.

Circular Time Shift Modulation

Various embodiments improve the reliability of UACs at the physical layer using a new modulation scheme that enhances the robustness of the system by utilizing the high auto-correlation of ZCZ signals, denoted herein as Circular Time Shift Modulation (CTSM). For K-ary CTSM, the various embodiments first map the original bit sequences to CTSM modulated signals by converting every $M=\log_2(K)$ bits to a decimal value which is exactly the value of the circular time shift applied to the initial CTSM signal, i.e., the ZCZ signal. The ZCZ signal is of high autocorrelation and the cross-correlation with the nonzero-time-shift signal is zero, so the periodic auto-correlation function of a ZCZ signal is an impulse function, while the periodic cross-correlation function between a ZCZ signal and a nonzero-time-shift ZCZ signal is an impulse function with the time shift. In the channel with multipath, the received time-delayed ZCZ signals can be seen or perceived as the nonzero-time-shift signals. Therefore, the multipath information can be obtained by calculating the periodic cross-correlation function between the received ZCZ signals and the transmitted ZCZ signal. In the Rician fading channel, which is the common model of the underwater channel, especially in the shallow water, the magnitude of the impulse response of the LOS path is always higher than that of multipath, and the signal through LOS path is usually firstly received by the receiver. If the input ZCZ signal is with a non-zero time shift, then the periodic cross-correlation function will be the channel response with the time shift. Therefore, the highest magnitude of the channel response corresponds to the time shift, and the peak detection is able to find the time shift and demodulate the signal.

Zero-Correlation-Zone Signal: Let $\alpha$ be the CTSM signal, $$\alpha_k = \alpha[k] = \exp\left[\frac{2\pi\sqrt{-1}\,k^2}{K}\right],\ k = 0, 1, \ldots, K-1, \tag{1}$$

where K is the length of $\alpha$.

It is noted that the periodic auto-correlation function of $\alpha$ is an impulse, as follows:

$$R_a(\alpha) = \frac{1}{K}\alpha A = [1, 0, \ldots, 0]^T = \delta[k], \tag{2}$$

-continued $$A = \begin{bmatrix} \overline{\alpha_0} & \overline{\alpha_{K-1}} & \ldots & \overline{\alpha_1} \\ \overline{\alpha_1} & \overline{\alpha_0} & \ldots & \overline{\alpha_2} \\ \vdots & \vdots & \ddots & \vdots \\ \overline{\alpha_{K-1}} & \overline{\alpha_{K-2}} & \ldots & \overline{\alpha_0} \end{bmatrix}, \tag{3}$$

where A is the matrix for calculating periodic correlation of $\alpha$; $\overline{\alpha_k}$ is the complex conjugate of $\alpha_k$; "$^T$" is a transpose of a matrix; $\delta[k]$ is an impulse signal.

Since the auto-correlation function of $\alpha$ has zero-sidelobe zone, $\alpha$ is denoted as a ZCZ signal.

CTSM Modulator: Consider K-ary CTSM modulation, in which $M=\log_2(K)$ message bits are encoded by the CTSM signal with a length of K in each frame. Let $x_n$ be the transmitted signal, $$x_n = \alpha \circledast \delta[k-n], \tag{4}$$

$$x_n[k] = \alpha[\langle k-n \rangle_K],\ n=0,1,\ldots,K-1,\ k=0,1,\ldots,K-1, \tag{5}$$

where "$\circledast$" denotes a circular convolution, $x_0=\alpha$, $\alpha[\langle k-n\rangle_K]$ represents a circular shift of $\alpha$ by n samples to the right.

Each circular time shift contains a different message which are modulated bits. For example, when the modulation order K=16, a $M=\log_2(K)=4$-bit sequence "1001" corresponds to the 16-ary CTSM signal $x_9[k]=\alpha[\langle k-9\rangle_{16}]$.

When calculating the periodic cross-correlation function between $x_n$ and $\alpha$, the following is provided, $$\begin{aligned} R_c(x_n, \alpha) &= \frac{1}{K}x_n A = \frac{1}{K}\alpha \circledast \delta[k-n] A \\ &= \frac{1}{K}\alpha A \circledast \delta[k-n] = \delta[k] \circledast \delta[k-n], \\ &= \delta[k-n],\ n = 0, 1, \ldots, K-1. \end{aligned} \tag{6}$$

CTSM Demodulator: Assume that there is only one hydrophone at the receiver, the transmitted signal $x_n$ is through the channel with a response $h=[h_0, h_1, h_2, \ldots]$, the received CTSM signals $\hat{y}_n$ can be expressed as, $$\hat{y}_n = x_n * h, \tag{7}$$

where "*" denotes a convolution.

To reduce the Inter-Symbol Interference (ISI), a Cyclic Prefix (CP) with a length of L is added, $L \le K$. Assume $\hat{L}$ is the maximum multipath delay in the time-discrete model. When $L \ge \hat{L}$, the channel reverberation is correctable. There is a relationship between the CP-removed sequence $y_n$, the input sequence $x_n$, and the channel response h, as follows, $$\begin{aligned} y_n &= x_n \circledast h \\ &= x_n \begin{bmatrix} h_0 & h_1 & \ldots & h_{K-1} \\ h_{K-1} & h_0 & \ldots & h_{K-2} \\ \vdots & \vdots & \ddots & \vdots \\ h_1 & h_2 & \ldots & h_0 \end{bmatrix}. \end{aligned} \tag{8}$$

If $\alpha$ is shared by the transmitter as well as the receiver, the channel impulse response can be obtained by calculating the periodic cross-correlation function between $y_n$ and $\alpha$, $$R_c(y_n, \alpha) = \frac{1}{K} y_n A = \frac{1}{K} x_n \circledast hA = \frac{1}{K} x_n A \circledast h = \delta[k-n] \circledast h = h[\langle k-n \rangle_K],\ n = 0, 1, \ldots, K-1. \tag{9}$$

In the UACs, the channel model is usually the Rician fading channel, where the magnitude of the LOS path impulse $h_0$ should be the highest among $[h_0, h_1, h_2, \ldots]$. Therefore, the receiver only needs to do the peak detection after calculating $R_c(y_n, \alpha)$. The position of the peak is the circular shift n.

The inventors used various physical-layer emulation and experiment settings of an exemplary CTSM system, as illustrated by the systems and parameters thereof below. To emphasize the performance of the modulation schemes, emulation results of the BER and the spectral efficiency without channel coding are provided herein. The performance of the Reed-Solomon (RS)-coded BER with different code rates is also presented. To show the influence of Doppler frequency shift with different water wave speed, the Doppler recovery techniques are not introduced for the Doppler effect compensation.

FIG. 1 depicts a simplified block diagram of an underwater communications system according to various embodiments. In particular, the system 100 of FIG. 1 was used by the inventors to model, emulate, and/or verify under operating conditions various operational parameters, properties, and capabilities of the disclosed embodiments.

A transmitter T includes a CTSM modulator 110 comprising a binary-to-decimal converter 112 configured to receive and process an input bitstream in accordance with ZCZ mapping (such as discussed above with respect to equations 1-3). That is, the input binary bits are converted to decimal values. Given a modulation order of K, every $M=\log_2(K)$ bits are converted to a decimal value. The resulting ZCZ mapped bitstream is provided to a CTSM mapper 114 and processed in accordance with an initial CTSM signal α(t) (such as discussed above with respect to equations 4-6) to provide thereby an output CTSM signal $S_{CTSM}$ (t) for underwater transmission via an acoustic output device or speaker Tx. That is, the decimal value is applied to the circular time shift of the initial CTSM signal α(t). There will be K values of circular time shifts in total, from 0 to K−1.

The CTSM signal $S_{CTSM}$ (t) is transmitted by the transmitter speaker Tx and received by a hydrophone Rx of a receiver R as received signal r(t). At the receiver R, time synchronization of the received signal r(t) is performed prior to CTSM demodulation via a synchronizer 120. A periodic cross-correlation function 132 between the received CTSM signals $S_{CTSM}$ (t) and the initial CTSM signal α(t) and the peak detection is subsequently performed. The position of the peaks corresponds to the circular time shift and, with the decimal to binary conversion, the received signals are demodulated.

Figure 2A:
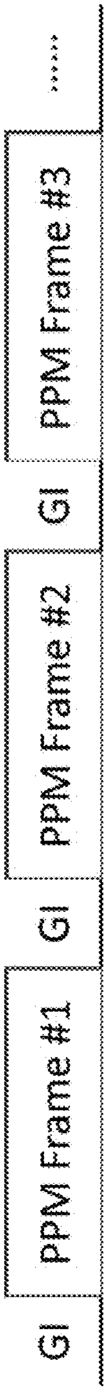
FIGS. 2A-2C graphically depict signaling structured of, respectively, Pulse Position Modulation (PPM) frames with zero-Guard Intervals (GIs), Spread Spectrum-based PPM (SS-PPM) frames with zero-GIs, and CTSM frames with Cyclic Prefix (CP)
Figure 2B:
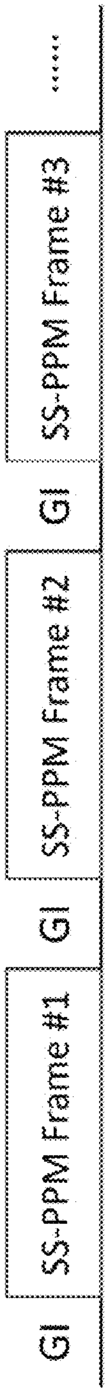
Figure 2C:
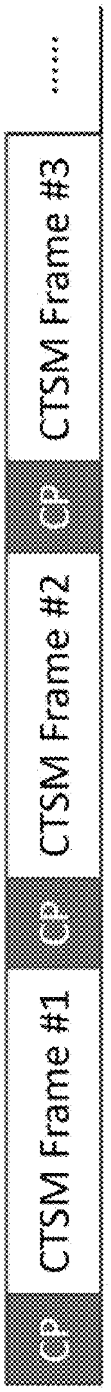

FIGS. 2A-2C graphically depict signaling structured of, respectively, PPM frames with zero-Guard Intervals (GIs), SS-PPM frames with zero-GIs, and CTSM frames with Cyclic Prefix (CP). In particular, FIG. 2 shows the transmitted signal structures of PPM, SS-PPM and CTSM, where the PPM/SS-PPM utilizes zero-Guard Intervals (GIs) to reduce the ISI, and the CTSM utilizes CP to reduce the ISI.

Figure 3:
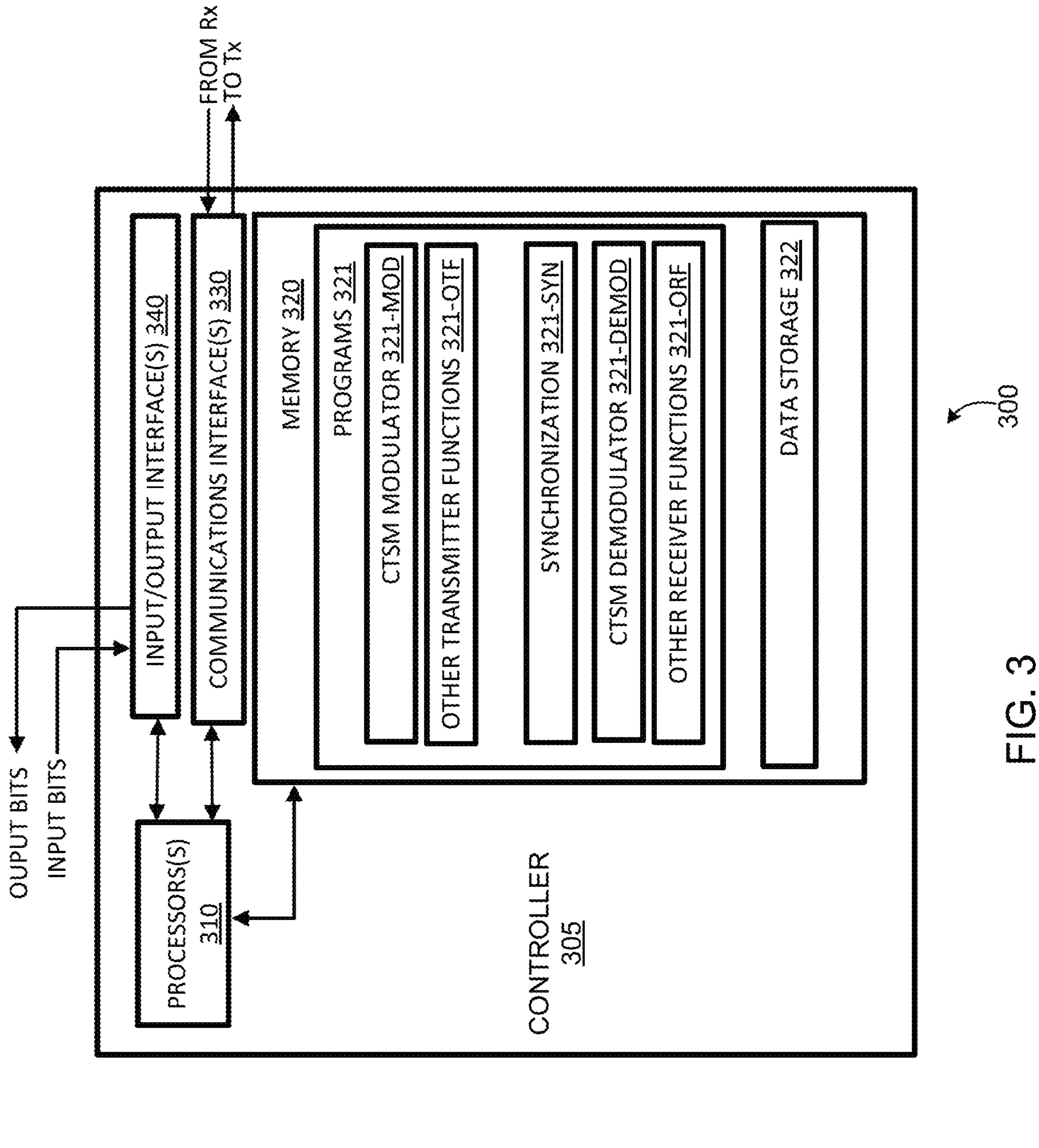
FIG. 3 depicts a high-level block diagram of a controller suitable for use in various embodiments.

FIG. 3 depicts a high-level block diagram of a controller suitable for use in various embodiments, such as to implement a transmitter, receiver, or transceiver in accordance with the various embodiments. The controller 305 depicted in FIG. 3 comprises a computing device that may be configured to perform various computing, processing, control, and/or other functions such as described herein with respect to the figures and equations. For example, the controller 305 may perform various transmitter and/or receiver functions such as described herein with respect to the various figures and equations.

As depicted in FIG. 3, the controller 305 includes one or more processors 310, a memory 320, a communications interface 330, and input-output (I/O) interface(s) 340. The processor(s) 310 are coupled to each of memory 320, communication interfaces 330, and I/O interfaces 340.

The processor(s) 310 are configured for controlling the operation of controller 305, including operations supporting the methodologies described herein with respect to the various embodiments. Similarly, the memory 320 is configured for storing information suitable for use by the processor (s) 310. Specifically, memory 320 may store programs 321, data 322 and so on. Within the context of the various embodiments, the programs 321 and data 322 may vary depending upon the specific functions implemented by the controller 305. For example, as depicted in FIG. 3, the programs portion 321 of memory 320 includes a CTSM modulator 321-MOD, other transmitter functions 321-OTF, a synchronization function 321-SYNC, a CTSM demodulator 321-DEMOD, and other receiver functions 321-ORF (optionally other functional elements/modules) configured to implement various computing, control, management, and/or other functions discussed in this specification.

Generally speaking, the memory 320 may store any information suitable for use by the controller 305 in implementing one or more of the various methodologies or mechanisms described herein. It will be noted that while various functions are associated with specific programs or databases, there is no requirement that such functions be associated in the specific manner. Thus, any implementations achieving the functions of the various embodiments may be used.

The communications interfaces 330 may include one or more services signaling interfaces adapted to facilitate the transfer of information, files, data, messages, requests, and the like between various entities in accordance with the embodiments discussed herein.

The I/O interface 340 and/or communications interfaces 330 may be coupled to receive input bitstreams for CTSM modulation and transmission and/or to provide output bitstreams resulting from CTSM demodulation. Various input/output devices may be used for such purposes.

Various embodiments are implemented using a controller 305 comprising processing resources (e.g., one or more servers, processors and/or virtualized processing elements or compute resources) and non-transitory memory resources (e.g., one or more storage devices, memories and/or virtualized memory elements or storage resources), wherein the processing resources are configured to execute software instructions stored in the non-transitory memory resources to implement thereby the various methods and processes described herein. As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

It is contemplated that some of the steps discussed herein as software methods may be implemented within special-purpose hardware, for example, as circuitry that cooperates with the processor to perform various method steps.

Although primarily depicted and described as having specific types and arrangements of components, it will be appreciated that any other suitable types and/or arrangements of components may be used for controller 305.

The above-described embodiments are primarily directed to SRO-based radar sensors configured to detect Doppler signatures associated with motion of multiple targets, such as vital signs (breathing and/or heartbeat) of multiple human targets. These embodiments use an amplitude modulation (AM) characteristic for SRO radar detection which is not ideal for determining target distance or ranging information.

Figure 4:
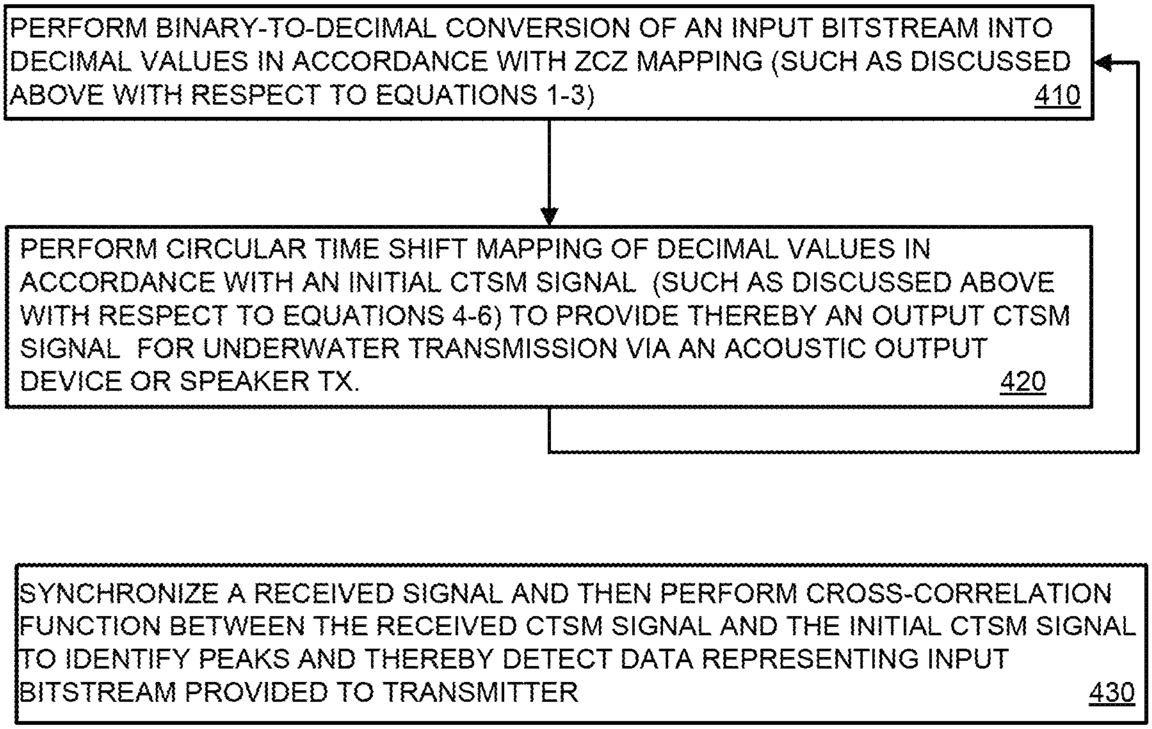
FIG. 4 depicts a flow diagram of a method according to an embodiment.

FIG. 4 depicts a flow diagram of method according to an embodiment. Specifically, FIG. 4 contemplates a method 400 suitable for processing received input bitstreams for CTSM modulation and transmission at a transmitter, and for synchronizing and demodulating a received CTSM modulated signal.

At step 410, binary-to-decimal conversion of an input bitstream into decimal values is performed in accordance with ZCZ mapping (such as discussed above with respect to equations 1-3).

At step 420, the ZCZ mapped bitstream is circular time shift mapped in accordance with an initial CTSM signal $\alpha(t)$ (such as discussed above with respect to equations 4-6) to provide thereby an output CTSM signal $S_{CTSM}(t)$ for underwater transmission via an acoustic output device or speaker Tx.

Steps 410-420 represent transmitter functions that are repeated as necessary to encode and transmit data.

At step 430, a received signal is time synchronized prior to performing a cross-correlation function between the received CTSM signal and the initial CTSM signal to identify peaks and thereby detect data representing input bitstream provided to transmitter.

Step 430 represent receiver functions that are repeated as necessary to receive and decode data.

The various embodiments address the issues of doubly spread effects plus additive noise by using Zero-Correlation-Zone (ZCZ) signals whose auto-correlation function has zero-sidelobe zone. At the transmitter side, the data are mapped to the corresponding circular time shifts in ZCZ signals. At the receiver side, the periodic cross-correlation function between the received ZCZ signals and the initial ZCZ signal are determined. The position of the peak of the periodic cross-correlation function is exactly the time shift, and the data may then be demodulated successfully. Unlike PPM, the various embodiments provide peak detection with the periodic cross-correlation between the received ZCZ signals and the initial signal, while in the PPM, the peak detection is done with the received PPM signals.

The parameter settings/values used by the inventors with respect to exemplary embodiment of the system 100 of FIG. 1 are provided below with respect to Table 1.

TABLE 1

| Parameter | Value |
|---|---|
| DAC sampling rate | 48 kHz |
| Symbol rate | 6 kBd |
| Frequency band | 8-14 kHz |
| Bandwidth of LOON testbed | 6 kHz |
| ADC sampling rate | 128 kHz |
| Modulation order K | 4, 8, 16, 32 |
| Carrier frequency $f_c$ | 11 kHz |
| Sound power level re 1 pW | 180 dB |
| CP/GI length | 0.21 ms |

Referring to FIG. 1 and Table 1, at the transmitter T, an exemplary carrier frequency of $f_c$=11 kHz is selected (other frequencies may also be selected, both above and below the emulator frequency). There is only one speaker and one hydrophone whose locations are fixed for purposes of the emulation, so the Doppler effect is mainly from the water wave. In the emulations, the wave speed is assumed to range in [0,0.3] m/s. The modulation order in the PPM/SS-PPM/CTSM frame is chosen to be 4, 8, 16, 32, so that the reliability with different modulation schemes can be observed. To compare iterations of the modulations, signal equalization was performed so that the power values of different modulations with different orders are substantially equal. The frequency band is 8-14 kHz so the bandwidth is limited to approximately 6 kHz. The sampling rate of the Digital-to-Analog Converter (DAC) is up to 48 KHz and the sampling rate of the Analog-to-Digital Converter (ADC) is up to 128 kHz. The sound power level re 1 pW is 180 dB. The length of CP/GI is set as 0.21 ms. The additive noise is assumed to be the Additive White Gaussian Noise (AWGN).

Systems and Performance Evaluation

The novel physical-layer modulation scheme for underwater acoustic communications discussed herein and denoted as Circular Time Shift Modulation (CTSM) improvise system robustness when in underwater acoustic channels affected by doubly spread effects and additive noise. One feature of CTSM modulation is the utilization of the high autocorrelation of Zero-Correlation-Zone (ZCZ) signals. The CTSM was further validated under emulations and at-sea experiments. Results indicated that the proposed CTSM modulation reaches a Signal-to-Noise Ratio (SNR) gain of several dB compared with the ordinary PPM and SS-PPM modulation schemes. The trade-off between Bit Error Rate (BER) and uncoded spectral efficiency was also discussed.

A physical-layer evaluation of the new modulation scheme has been carried out under a real underwater acoustic channel collected using the Littoral Ocean Observatory Network (LOON) testbed (located in the Gulf of La Spezia, Italy) hosted at the NATO Science and Technology Organization Centre for Maritime Research and Experimentation (CMRE) in June 2021. The performance includes results of Bit Error Rate (BER) with varying SNR, multipath lifetime and different water wave speeds (the moving speed of the propagation medium). Further, at-sea acoustic communication experiments were also conducted at Barnegat Bay, NJ, in October 2022, based on Universal Software Radio Peripheral (USRP) X-300 Software-Defined Radio (SDR) boards designed by National Instrument (NI). The BER and spectral efficiency performance of PPM, Spread Spectrum-based PPM (SS-PPM) and CTSM with different channels and different modulation parameters are compared and analyzed in various figures below. The physical-layer results indicate that the CTSM system achieves SNR gain of several dB compared with ordinary PPM setups and a higher spectral efficiency compared with SS-PPM setups. The performance degradation caused by the multipath/Doppler effects and additive noise is alleviated by the high auto-correlation of CTSM, which shows that the CTSM improves the system robustness significantly. The trade-off with the CTSM modulation order to balance the transmission data rate and system reliability is also discussed.

Results and Findings: The major findings of the following emulation results include system robustness enhancement when in channels with multipath delay and additive noise and the SNR gain measured by the uncoded BER.

Figure 5A:
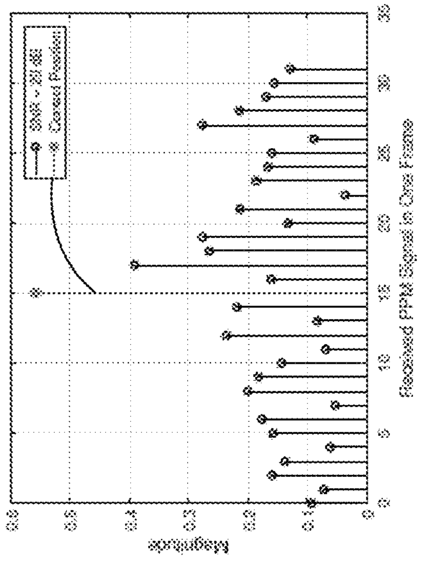
FIGS. 5A-5F graphically illustrate system performance under various conditions.
Figure 5B:
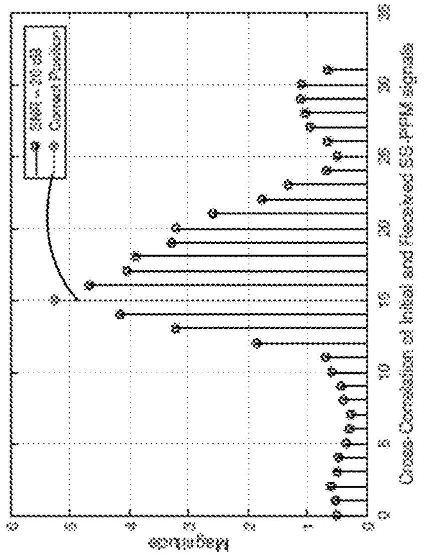
Figure 5C:
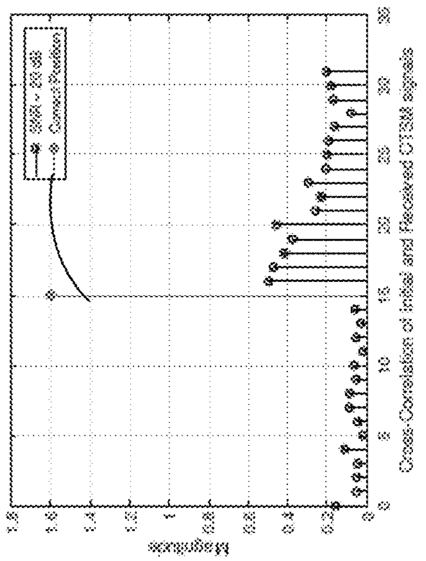
Figure 5D:
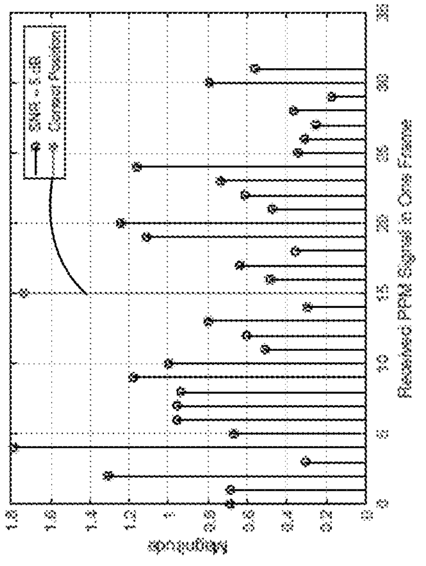
Figure 5E:
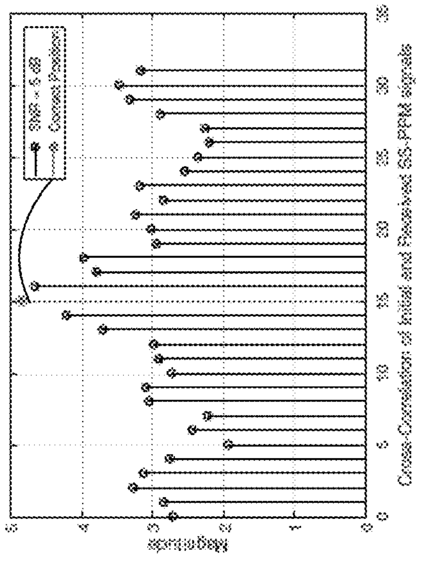
Figure 5F:
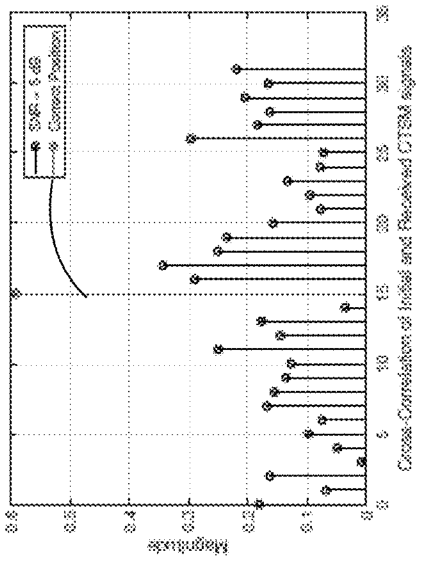

FIGS. 5A-5F graphically illustrate system performance under various conditions. Specifically, the conditions associated with FIGS. 5A-5F are multipath lifetime is 3.13 ms, water wave speed is 0 m/s, the CTSM time shift or the PPM pulse position is 15. Under these conditions, and assuming a SNR of 20 dB, FIG. 5A illustrates received PPM signal in one frame; FIG. 5B illustrates cross-correlation of the received SS-PPM signal and initial spreading sequence; and FIG. 5C illustrates periodic cross-correlation of the received CTSM signal and the initial CTSM signal. Under these conditions, and assuming a SNR of 5 dB, FIG. 5D illustrates received PPM signal in one frame; FIG. 5E illustrates cross-correlation of the received SS-PPM signal and initial spreading sequence; and FIG. 5F illustrates periodic cross-correlation of the received CTSM signal and initial CTSM signal.

FIGS. 5A-5F, which are based on the ordinary PPM, the SS-PPM with a spreading length of 4, and the CTSM, it is found that the system robustness in the channel with multipath and additive noise is improved significantly by CTSM. To observe the performance of PPM/SS-PPM/CTSM with different levels of SNR, fix the multipath delay with a lifetime of 3.13 ms. Specifically, FIGS. 5A and 5D depict the received PPM signal and the peak detection. FIGS. 5B and 5E depict the cross-correlation function between the received SS-PPM signals and the initial spreading sequence. FIGS. 5C and 5F depict the periodic cross-correlation function between the received CTSM signals and the initial CTSM signal, i.e., $R_c(y_n, \alpha)$ in Eq. (9). When the SNR is 20 dB, it can be observed that the peak detection works effectively in PPM/SS-PPM/CTSM, where the pulse positions and the correct circular time shift can be found and the received signals can be demodulated successfully. When the SNR is 5 dB, the peak detection still works with the SS-PPM/CTSM and the SS-PPM/CTSM signals can be demodulated correctly. However, for the PPM, due to the combined effects of the multipath delay and the additive noise, the peak of the received PPM signal is no longer at the correct pulse position. Therefore, errors occur in the PPM demodulation. Moreover, it is obvious that the interference in the periodic cross-correlation of the received CTSM is much less than that in the cross-correlation of the received SS-PPM.

Figure 6A:
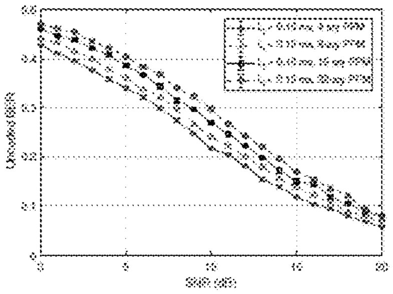
FIGS. 6A-6I graphically illustrate uncoded Bit Error Rate (BER) performance of the PPM/SS-PPM/CTSM with different channel conditions.
Figure 6B:
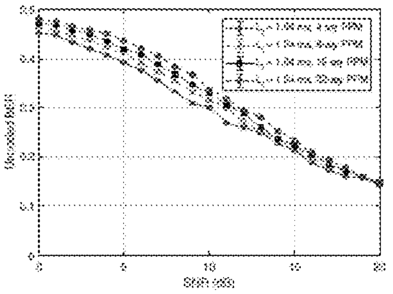
Figure 6C:
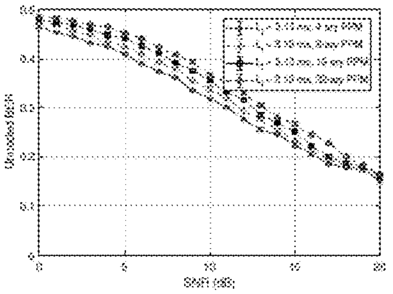
Figure 6D:
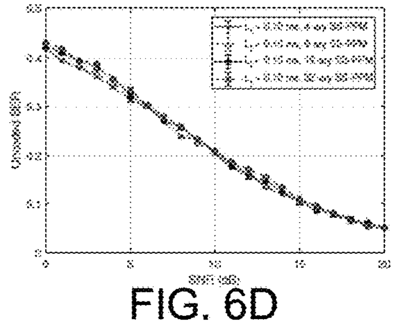
Figure 6E:
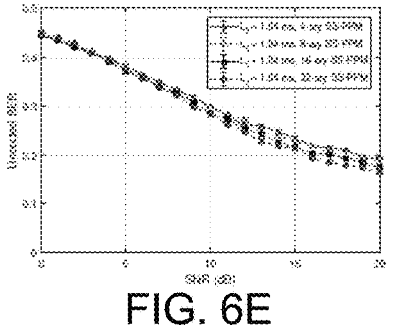
Figure 6F:
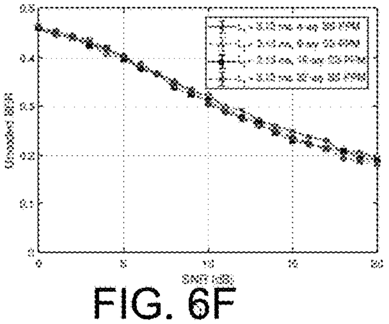
Figure 6G:
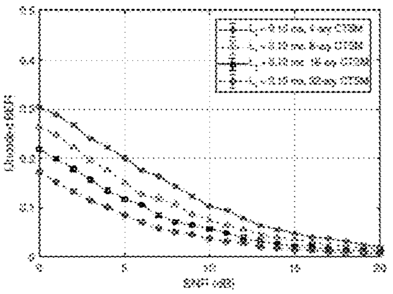
Figure 6H:
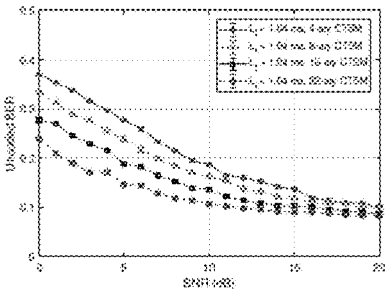
Figure 6I:
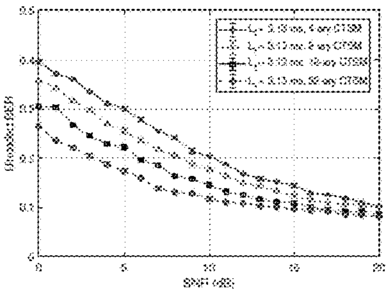

FIGS. 6A-6I graphically illustrate uncoded BER performance of the PPM/SS-PPM/CTSM with different channel conditions. Specifically, $L_t$ represents the multipath lifetime. When the water wave speed is 0 m/s, the uncoded BER of PPM with different values of multipath lifetime, as follows: FIG. 6A, $L_t$=0.10 ms; FIG. 6B, $L_t$=1.04 ms; FIG. 6C, $L_t$=3.13 ms. The uncoded BER of SS-PPM with different values of multipath lifetime, as follows: FIG. 6D, $L_t$=0.10 ms; FIG. 6E, $L_t$=1.04 ms; FIG. 6F, $L_t$=3.13 ms. The uncoded BER of CTSM with different values of multipath lifetime, as follows: FIG. 6G, $L_t$=0.10 ms; FIG. 6H, $L_t$=1.04 ms; FIG. 6I, $L_t$=3.13 ms. Note that the and 95% confidence intervals are <0.01 and hence are not visible in the figures. The uncoded BER in the UAC with high multipath cannot reach values lower than $10^{-2}$, so a linear scale is used instead of a log scale.

FIGS. 6A-6I graphically illustrate uncoded BER performance of the PPM/SS-PPM/CTSM with different channel conditions. The SNR varies from 0 to 20 dB and the water wave speed is assumed to be 0 m/s, so the Doppler frequency shift is not considered. The uncoded BER performance of the PPM with the increasing of the modulation order is shown in FIGS. 6A-6C. The uncoded BER performance of the SS-PPM is similar with different modulation orders and is slightly lower than the uncoded BER of the 4-ary PPM. The performance of CTSM is depicted in FIGS. 6G-6I, where it can be seen that the uncoded BER of CTSM is much lower than that of PPM/SS-PPM. In addition, the uncoded BER performance of CTSM with a higher modulation order is better than that with a lower modulation order, since with a higher modulation order the ZCZ signal is longer, which leads to a higher autocorrelation and increases the accuracy of peak detection. Given the CP length is 0.21 ms, the uncoded BER of 32-ary CTSM reaches 0 when the SNR is 20 dB, as shown in FIG. 6G. However, when the multipath lifetime is longer than the CP length, as shown in FIGS. 6H-6I, the uncoded BER increases dramatically because the autocorrelation of the CTSM is damaged by the multipath delay. When the multipath lifetime is 0.10 ms, the uncoded BER of 4-ary CTSM is lower than 0.1 when the SNR is higher than 10 dB, and the uncoded BER of 4-ary PPM is lower than 0.1 when the SNR is higher than 16 dB. The uncoded BER of 32-ary CTSM is lower than 0.1 when the SNR is higher than 4 dB, and the uncoded BER of 32-ary PPM is lower than 0.1 when the SNR is higher than 19 dB. Comparing the uncoded BER performance versus SNR of CTSM and PPM, it can be seen that that the CTSM reaches an SNR gain of more than 6 dB. When channel coding is applied, the BER of the CTSM is reduced.

Figure 7A:
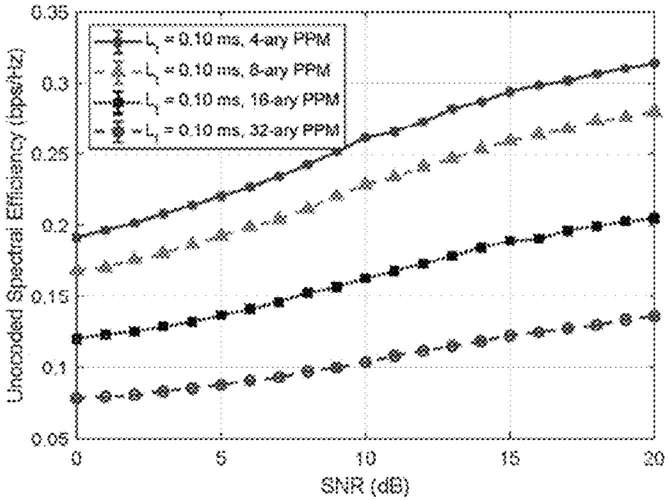
FIGS. 7A-7I graphically illustrate uncoded spectral efficiency performance of systems with the PPM/SS-PPM/CTSM under various conditions.
Figure 7B:
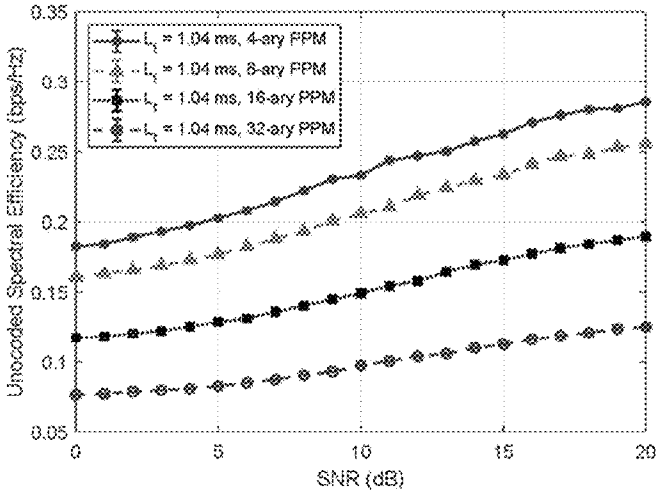
Figure 7C:
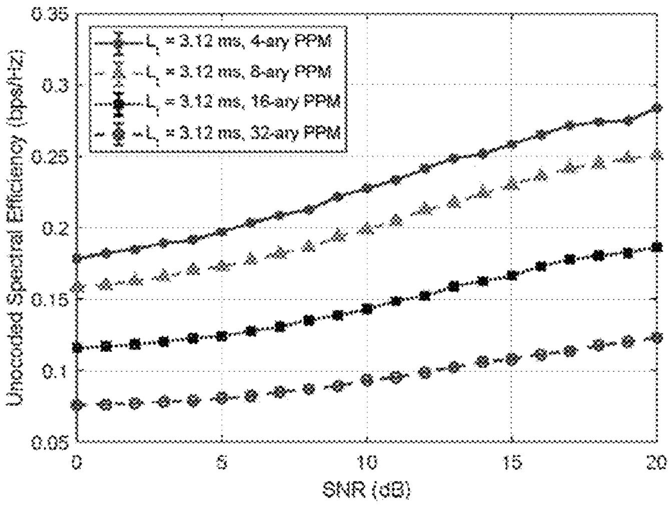
Figure 7D:
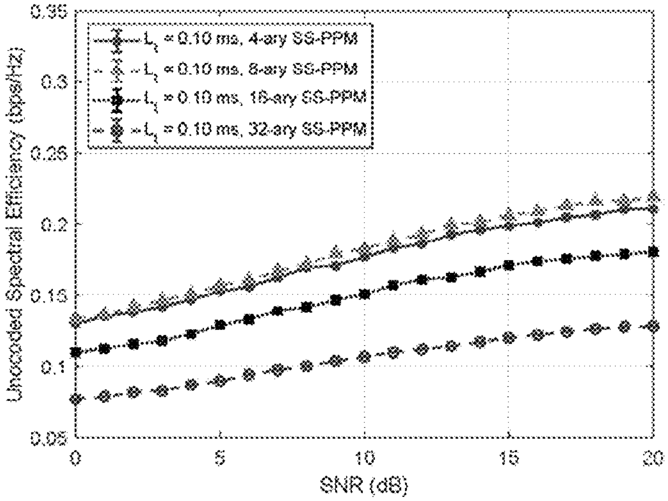
Figure 7E:
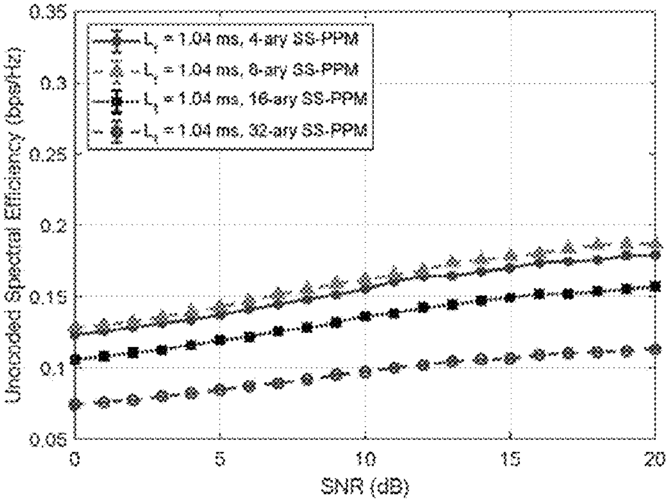
Figure 7F:
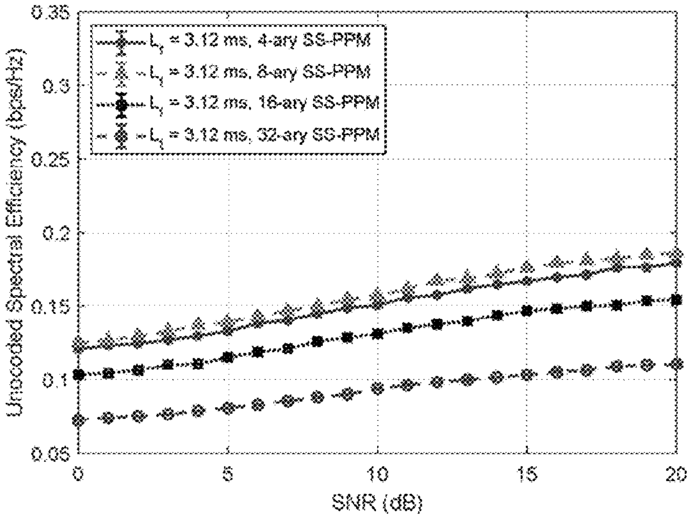
Figure 7G:
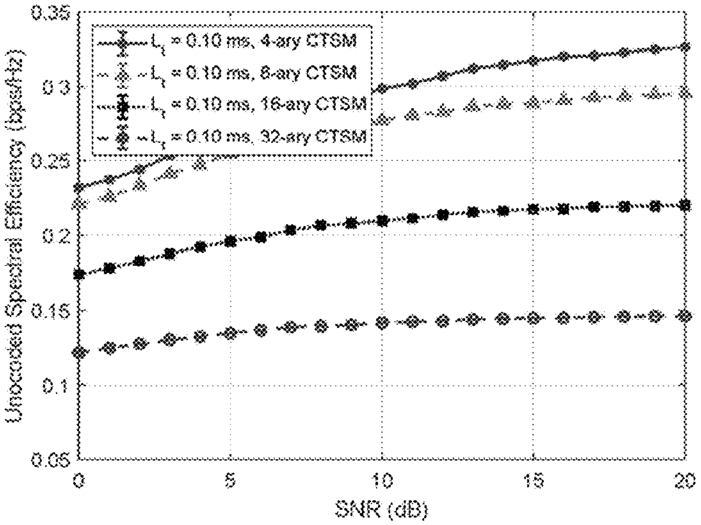
Figure 7H:
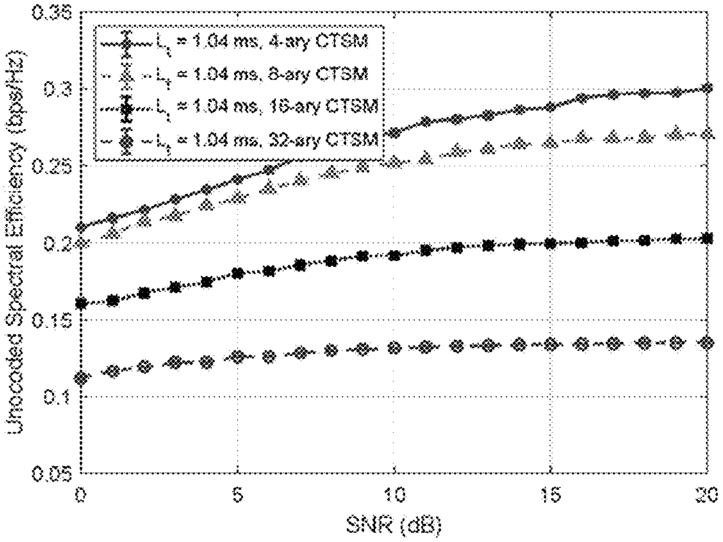
Figure 7I:
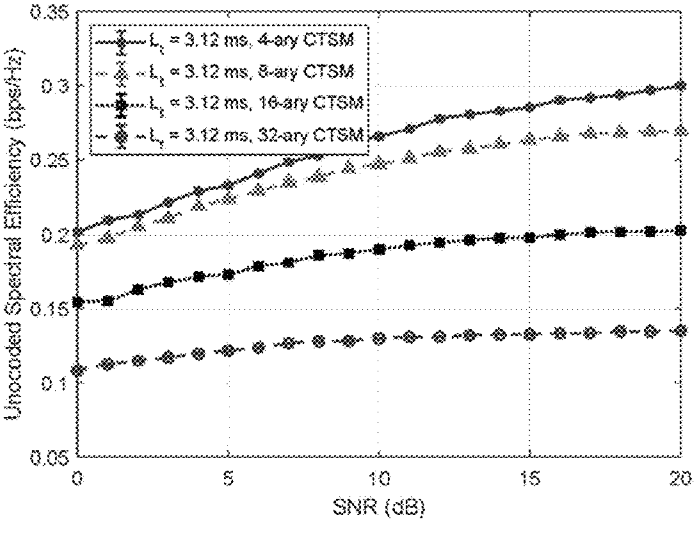

FIGS. 7A-7I graphically illustrate uncoded spectral efficiency performance of systems with the PPM/SS-PPM/CTSM, where the bandwidth is 6 kHz. Specifically, when the water wave speed is 0 m/s, the uncoded spectral efficiency of PPM with different values of multipath lifetime are as follows: FIG. 7A $L_t$=0.10 ms; FIG. 7B $L_t$=1.04 ms; FIG. 7C $L_t$=3.13 ms. The uncoded spectral efficiency of SS-PPM with different values of multipath lifetime are as follows: FIG. 7D $L_t$=0.10 ms; FIG. 7E $L_t$=1.04 ms; FIG. 7F $L_t$=3.13 ms. The uncoded spectral efficiency of CTSM with different values of multipath lifetime are as follows: FIG. 7G $L_t$=0.10 ms; FIG. 7H $L_t$=1.04 ms; FIG. 7I $L_t$=3.13 ms. The 95% confidence intervals are close to $10^{-3}$ and hence are not visible in the figures. The uncoded spectral efficiency n is calculated as follows, $$\eta = \begin{cases} \dfrac{f_s \times \log_2(K)}{B_w(L+K)}(1-\epsilon), & \text{for } PPM/CTSM, \\ \dfrac{f_s \times \log_2(K)}{B_w(L+K+L_s-1)}(1-\epsilon), & \text{for } SS\text{-}PPM, \end{cases} \tag{10}$$

where $f_s$ is the symbol rate in Bd; $B_w$ is the bandwidth; K is the modulation order;

L is the length of the CP in the time-discrete model; $L_s$ is the spreading length of the SS-PPM; E is the uncoded BER.

It can be observed from FIGS. 7A-7I that the uncoded spectral efficiency of the CTSM is higher than that of the PPM, since the uncoded BER of the CTSM is much lower than that of the PPM. The spectral efficiency of SS-PPM is lower than for PPM/CTSM, because SS-PPM introduces the spreading sequence. Moreover, with a higher-order modulation, the uncoded spectral efficiency of CTSM decreases dramatically. Therefore, there is a trade-off between the BER and spectral efficiency. When the low BER is in demand, the higher modulation order is considered. When the high spectral efficiency is in demand, the lower modulation order is considered.

Figure 8A:
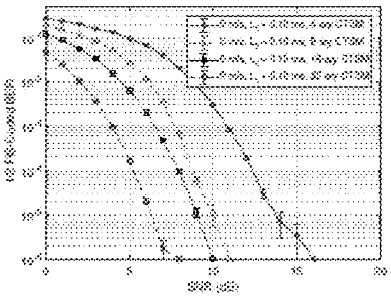
FIGS. 8A-8C graphically illustrate the BER of the CTSM with different channel coding rates of Reed-Solomon (RS) coding under various conditions.
Figure 8B:
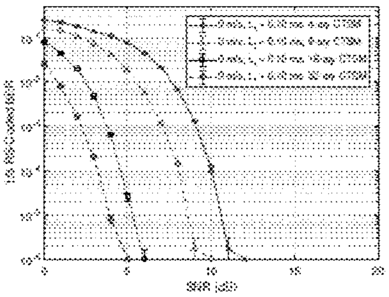
Figure 8C:
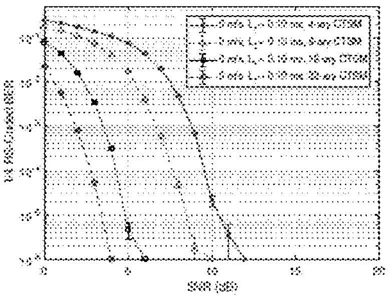

FIGS. 8A-8C graphically illustrate the BER of the CTSM with different channel coding rates of RS coding, which shows that with channel coding, the BER of 32-ary CTSM can reach as low as $10^{-6}$ when SNR is 4 dB with 1/4 RS code rate, which meets most users' demand. In FIG. 8A, The 4-ary CTSM reaches $10^{-6}$ when the SNR is higher than 16 dB, while the 32-ary CTSM reaches $10^{-6}$ when the SNR is higher than 8 dB. Therefore, the 32-ary CTSM achieves an SNR gain of 8 dB compared with 4-ary CTSM.

FIGS. 8A-8C graphically illustrate the BER of the CTSM with different channel coding rates of RS coding when the water wave speed is 0 m/s and $L_t$=0.10 ms, the RS-coded BER of CTSM with 1/2 code rate (FIG. 8A); 1/3 code rate (FIG. 8B); and 1/4 code rate (FIG. 8C) and with 95% confidence intervals.

Figure 9A:
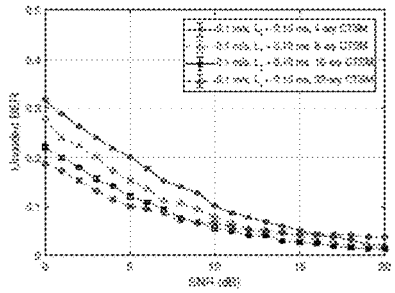
FIGS. 9A-9F graphically illustrate the uncoded BER performance of the CTSM without Doppler effect compensation under various conditions.
Figure 9B:
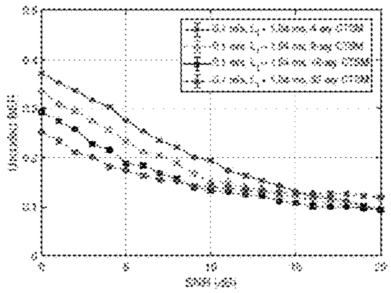
Figure 9C:
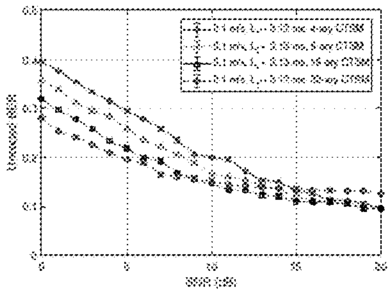
Figure 9D:
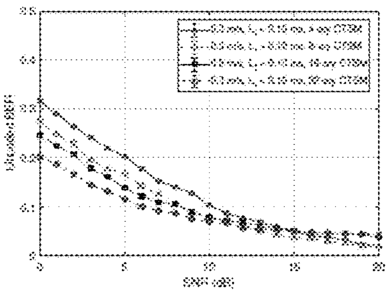
Figure 9E:
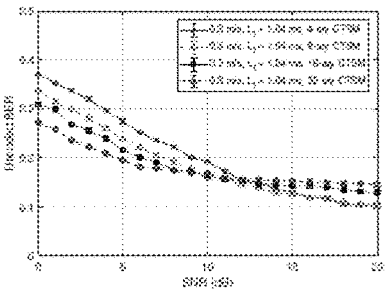
Figure 9F:
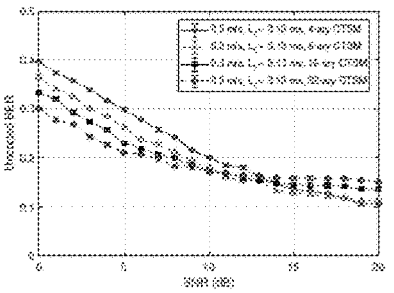

FIGS. 9A-9F graphically illustrate the uncoded BER performance of the CTSM without Doppler effect compensation under various conditions; specifically, when the water wave speed is 0.1 m/s, the uncoded BER of CTSM with different values of multipath lifetime: FIG. 9A, $L_t$=0.10 ms; FIG. 9B, $L_t$=1.04 ms; FIG. 9C, $L_t$=3.13 ms. When the wave speed is 0.3 m/s, the uncoded BER of PPM with different values of multipath lifetime: FIG. 9D, $L_t$=0.10 ms; FIG. 9E, $L_t$=1.04 ms; FIG. 9F, $L_t$=3.13 ms. The 95% confidence intervals are <0.01 and are not visible in the figures.

Specifically, to explore how Doppler frequency shift influences the performance of the system, FIG. 9 depicts the uncoded BER performance of the CTSM without Doppler effect compensation when the water wave speed is 0.1 m/s and 0.3 m/s. It can be seen that uncoded BER increases with a higher water wave speed, because the Doppler frequency shift is higher. Moreover, the Doppler frequency shift has more influence on the CTSM with a higher modulation order. When the multipath lifetime is 0.10 ms and the SNR is lower than 9 dB, the 32-ary CTSM has the lowest uncoded BER. However, when the SNR is higher than 10 dB, the uncoded BER of 32-ary CTSM is higher than the uncoded BER of 16-ary CTSM. And when the SNR is higher than 16 dB, the uncoded BER of 32-ary CTSM is even higher than that of the 4-ary CTSM. Therefore, it can be concluded that the higher modulation order of CTSM offers higher robustness with additive noise but is affected more by Doppler frequency shift compared with the lower modulation order. Therefore, there is a trade-off between the system robustness with Doppler frequency shift and additive noise. When the SNR is low, CTSM with higher order performs better. When the SNR is already very good, but the Doppler frequency shift is high, CTSM with lower modulation order performs better.

The inventors further conducted various field experiments at sea based on the emulation results using a transmitter and a receiver fixed on a boat with a distance between transducer and the hydrophone of approximately 5 m while submerged at a depth of approximately 0.5 m. The testbed comprised two laptop computers, two USRP X-300 boards (one as transmitter, one as receiver, each connected to a respective laptop computer), two RESON TC 4013 omnidirectional hydrophones/transducers, one PA2010PC hydrophone power amplifier (powerAmp), and one VP2000 voltage preamplifier (preAmp). One RESON TC 4013 can be used as either a hydrophone or a transducer. One hydrophone/transducer is connected to USRP board. MATLAB is utilized for signal processing, including coding/modulation at the transmitter and decoding/demodulation at the receiver. With Communications Toolbox, the MATLAB support package, and a USRP radio (X-300), practical software-defined radios systems are designed and verified. The specifications of the system are summarized below in Table 2. The signals are transmitted at the baseband.

TABLE 2

| Parameter | Value |
|---|---|
| DAC sampling rate | 200 kHz |
| Symbol rate | 50 kBd |
| Bandwidth of USRP testbed | 50 kHz |
| ADC sampling rate | 200 kHz |
| Modulation order K | 4, 8, 16, 32 |
| CP/GI length | 0.21 ms |
| preAmp gain | 10 dB |
| powerAmp gain | 36 dB |

Figure 10A:
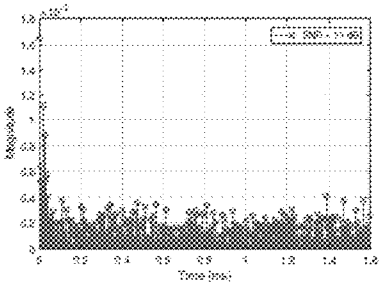
FIGS. 10A-10F graphically illustrate experimental results for various embodiments.
Figure 10B:
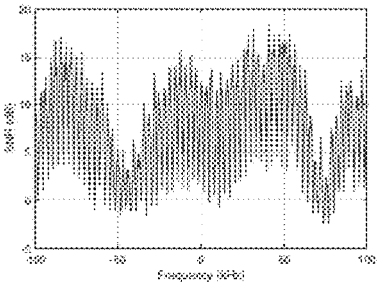
Figure 10C:
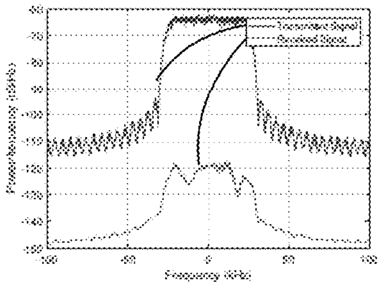
Figure 10D:
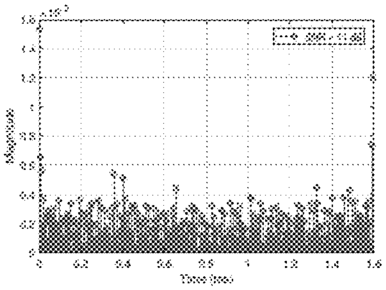
Figure 10E:
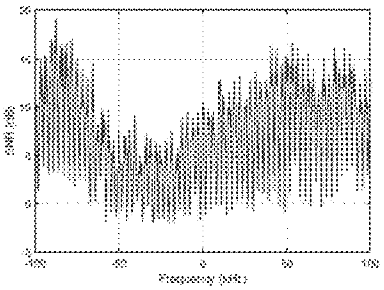
Figure 10F:
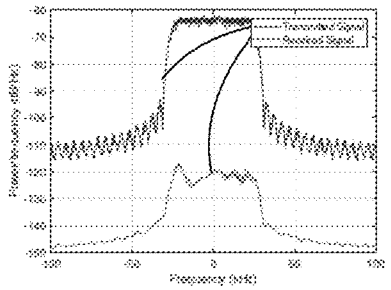

FIGS. 10A-10F graphically illustrate experimental results for various embodiments. Specifically, during no wind conditions there is graphically illustrated channel impulse response (FIG. 10A); SNR of received signals per frequency (FIG. 10B); and power spectrum density of transmitted/received signals (FIG. 10C). When there is wind, channel impulse response (FIG. 10D); SNR of received signals per frequency (FIG. 10E); and power spectrum density of transmitted/received signals (FIG. 10F). The average SNR in time domain is 11 dB. The channel impulse responses and SNR of received signals per frequency is provided, and the Power Spectrum Density (PSD) of the transmitted and received signals in baseband are also plotted for comparison. It can be seen that the channel with wind is more complex than that without wind. Note that even when there is no wind, the water wave speed is nonzero.

Figure 11A:
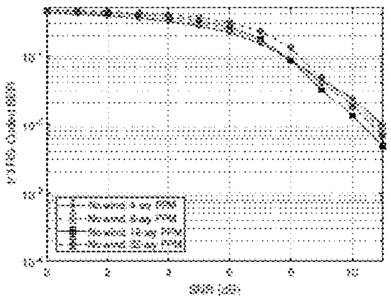
FIGS. 11A-11F graphically illustrate BER of PPM, SS-PPM and CTSM for various embodiments.
Figure 11B:
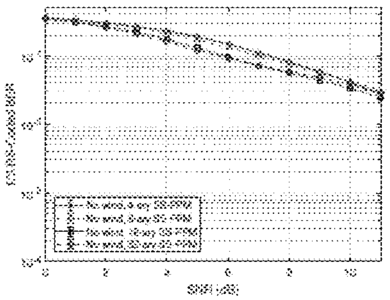
Figure 11C:
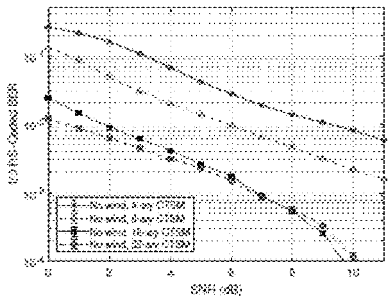
Figure 11D:
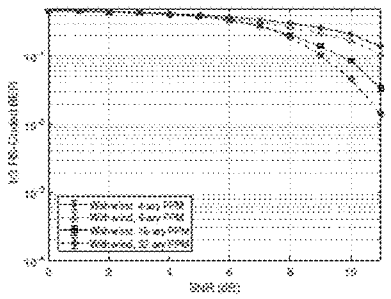
Figure 11E:
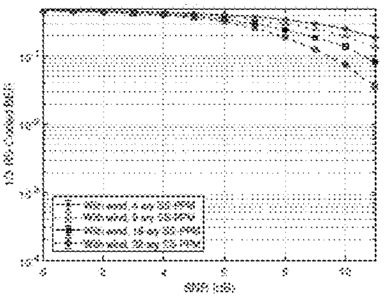
Figure 11F:
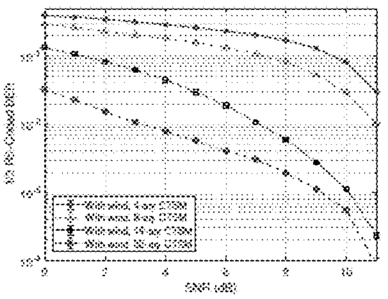

FIGS. 11A-11F graphically illustrate BER of PPM, SS-PPM and CTSM for various embodiments. In particular, where there is no wind, the BER with 1/3 RS code of PPM (FIG. 11A); SS-PPM (FIG. 11B); and CTSM (FIG. 11C). When there is wind, the BER with 1/3 RS code of PPM (FIG. 11D); SS-PPM (FIG. 11E); and CTSM (FIG. 11F). The maximal achievable SNR is only 11 dB. It can be seen that the BER of the proposed CTSM is much lower than that of PPM/SS-PPM with or without wind. The CTSM with a higher modulation order is more robust against the doubly spread effects compared with those with a lower modulation order. In FIG. 11C the BER of 32-ary CTSM is close to 16-ary CTSM, while in FIG. 11E the BER of 32-ary CTSM is significantly lower than 16-ary CTSM, which shows that 32-ary CTSM is more robust against Doppler spread effects than 16-CTSM when SNR is low.

Figure 12A:
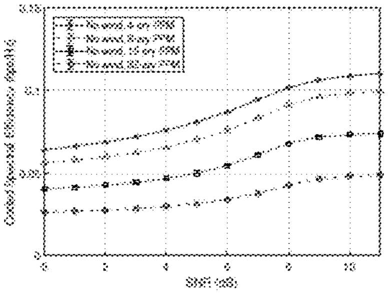
FIGS. 12A-12F graphically illustrate spectral efficiency of PPM, SS-PPM and CTSM for various embodiments.
Figure 12B:
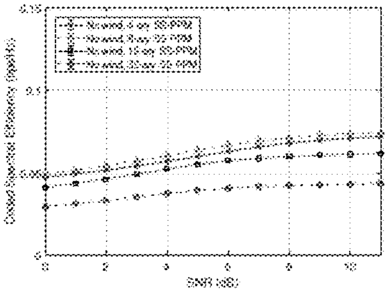
Figure 12C:
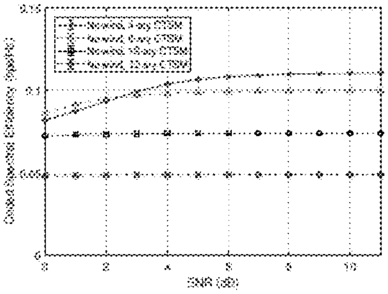
Figure 12D:
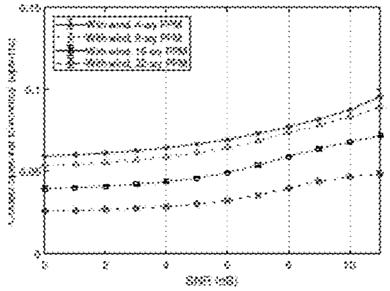
Figure 12E:
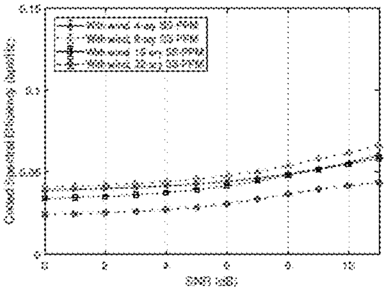
Figure 12F:
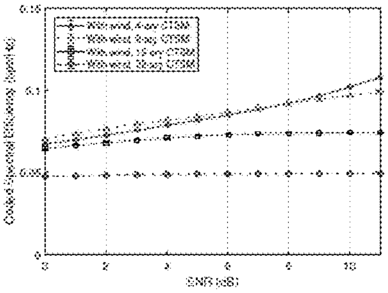

FIGS. 12A-12F graphically illustrate spectral efficiency of PPM, SS-PPM and CTSM for various embodiments. In particular, where there is no wind, the spectral efficiency with 1/3 RS code of PPM (FIG. 12A); SS-PPM (FIG. 12B); and CTSM (FIG. 12C). When there is wind, the spectral efficiency with 1/3 RS code of PPM (FIG. 12D); SS-PPM (FIG. 12E); and CTSM (FIG. 12F). It can be seen that that the spectral efficiency of CTSM is higher than PPM and SS-PPM when SNR is low. Note that there is intersection point in FIGS. 12C and 12F, due to lower modulation order is of higher data rate, while higher modulation order is more robust. Therefore, there is a trade-off between BER and spectral efficiency: When a low BER is needed, higher modulation order of CTSM should be used; On the other hand, when achieving a high spectral efficiency is more important, lower modulation order of CTSM should be adopted.

Non-Acoustic Applications

The various embodiments described and evaluated above are primarily directed to the use of CTSM within the context of underwater acoustic communications. As determined and described by the inventors, CTSM is robust against additive noise and multipath delay in Rician channels and, while described within the context of using CTSM in underwater acoustic communications for performance evaluations, it is noted that CTSM is not limited to underwater acoustic environments.

Specifically, various embodiments contemplate that CTSM may be advantageously employed within the context of, for example, static communications and other wireless communications if a Line-of-Sight~(LOS) signal is stronger than corresponding multipath delay signals. The relevant interfaces may be radio frequency (RF) interfaces such as for 802.11xx, LTE, 5G, and/or other RF/optical wavelength communications, wherein the RF interfaces are directed to transmitting RF/optical signal and receiving RF/optical signal within an environment having, for example, complex reflection and/or multipath characteristics (e.g., an urban setting).

As such, in various embodiments of the invention, the above-described description is specifically modified to contemplate RF and optical interfaces. For example, FIG. 1 as described above depicts a simplified block diagram of an underwater communications system according to various embodiments. However, the system 100 if FIG. 1 functions in a substantially similar manner within the context of a non-underwater communications system; namely, a free space RF or optical communications system.

Within the context of a free space RF or optical communications system, the system 100 of FIG. 1 is modified by replacing the transmitter speaker(s) Tx and receiver hydrophone(s) Rx with corresponding RF transmitter/receiver interfaces or optical transmitter/receiver interfaces. The other functions of the system 100 operate in substantially the same manner as described above with respect to FIG. 1.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method of communication, comprising:

converting input data into decimal values in accordance with Zero-Correlation-Zone (ZCZ) mapping;

modulating the ZCZ mapped decimal values in accordance with Circular Time Shift Modulation (CTSM); and transmitting the CTSM modulated signal.

2. The method of claim 1, wherein converting input data into decimal values in accordance with ZCZ mapping comprises mapping input data bit sequences to CTSM modulated signals by converting every $M=\log_2(K)$ bits to a decimal value which is exactly the value of the circular time shift applied to the initial CTSM signal to provide thereby a ZCZ signal.

3. The method of claim 2, wherein a periodic autocorrelation function of the ZCZ signal is an impulse function, while the periodic cross-correlation function between the ZCZ signal and a nonzero-time-shift ZCZ signal is an impulse function with a time shift.

4. The method of claim 3, wherein multipath information is obtained at a receiver by calculating a periodic cross-correlation function between received ZCZ signals and the transmitted ZCZ signal.

5. The method of claim 1, wherein for a CTSM signal denoted as α:

$$\alpha_k = \alpha[k] = \exp\left[\frac{2\pi\sqrt{-1}\,k^2}{K}\right],$$

k=0,1, . . . , K−1, where K is the length of α.

6. The method of claim 5, wherein for a K-ary CTSM modulation, in which $M=\log_2(K)$ message bits are encoded by the CTSM signal with a length of K in each frame, a transmitted signal $x_n$ comprises:

$$x_n=\alpha \circledast \delta[k-n],\ x_n[k]=\alpha[<k-n>_K],\ n=0,1,\ldots,K-1,\ k=0,1,\ldots,K-1,$$

where "$\circledast$" denotes a circular convolution, $x_0=\alpha$, $\alpha[<k-n>_K]$ represents a circular shift of α by n samples to the right.

7. The method of claim 1, wherein the CTSM modulated signal is transmitted via a submerged acoustic output device.

8. The method of claim 1, wherein the CTSM modulated signal is transmitted via a wireless transmission device.

9. An apparatus comprising:

a Circular Time Shift Modulation (CTSM) transmitter configured for generating a CTSM signal for transmission, the CTSM transmitter comprising:

a binary-to-decimal converter, for converting input data into decimal values in accordance with Zero-Correlation-Zone (ZCZ) mapping; and a circular time shift mapper, for modulating the ZCZ mapped decimal values in accordance with a Circular Time Shift Modulation (CTSM) scheme.

10. The apparatus of claim 9, wherein converting input data into decimal values in accordance with ZCZ mapping comprises mapping input data bit sequences to CTSM modulated signals by converting every $M=\log_2(K)$ bits to a decimal value which is exactly the value of the circular time shift applied to the initial CTSM signal to provide thereby a ZCZ signal.

11. The apparatus of claim 10, wherein a periodic autocorrelation function of the ZCZ signal is an impulse function, while the periodic cross-correlation function between the ZCZ signal and a nonzero-time-shift ZCZ signal is an impulse function with a time shift.

12. The apparatus of claim 11, further comprising:

a CTSM receiver configured for processing received signal r (t) associated with an undersea transmitted CTSM signal $S_{CTSM}$ (t), wherein multipath information is obtained at a receiver by calculating a periodic cross-correlation function between received ZCZ signals and the transmitted ZCZ signal.

13. The apparatus of claim 11, further comprising:

a CTSM receiver configured for processing received signal r (t) associated with a free space wireless transmitted CTSM signal $S_{CTSM}$ (t), wherein multipath information is obtained at a receiver by calculating a periodic cross-correlation function between received ZCZ signals and the transmitted ZCZ signal.

14. The apparatus of claim 13, wherein the free space wireless transmitted CTSM signal comprises a radio frequency (RF) signal or an optical wavelength signal.

15. A method of wireless communication, comprising:

converting input data into decimal values in accordance with Zero-Correlation-Zone (ZCZ) mapping;

modulating the ZCZ mapped decimal values in accordance with Circular Time Shift Modulation (CTSM); and transmitting the CTSM modulated signal via a wireless transmission device.

16. The method of claim 15, wherein converting input data into decimal values in accordance with ZCZ mapping comprises mapping input data bit sequences to CTSM modulated signals by converting every $M=\log_2$ (K) bits to a decimal value which is exactly the value of the circular time shift applied to the initial CTSM signal to provide thereby a ZCZ signal.

17. The method of claim 16, wherein a periodic autocorrelation function of the ZCZ signal is an impulse function, while the periodic cross-correlation function between the ZCZ signal and a nonzero-time-shift ZCZ signal is an impulse function with a time shift.

18. The method of claim 15, wherein multipath information is obtained at a receiver by calculating a periodic cross-correlation function between received ZCZ signals and the transmitted ZCZ signal.

19. The method of claim 15, wherein for a CTSM signal denoted as α:

$$\alpha_k = \alpha[k] = \exp\left[\frac{2\pi\sqrt{-1}\,k^2}{K}\right],$$

k=0,1, . . . , K−1, where K is the length of α.

20. The method of claim 19, wherein for a K-ary CTSM modulation, in which $M=\log_2$ (K) message bits are encoded by the CTSM signal with a length of K in each frame, a transmitted signal $x_n$ comprises:

$$x_n=\alpha \circledast \delta[k-n],\ x_n[k]=\alpha[\langle k-n\rangle_K],\ n=0,1,\ldots,K-1,\ k=0,1,\ldots,K-1,$$

where "$\circledast$" denotes a circular convolution, $x_0=\alpha$, $\alpha[\langle k-n\rangle_K]$ represents a circular shift of α by n samples to the right.

* * * * *